United States Patent
Sullivan et al.

(10) Patent No.: US 9,671,852 B2
(45) Date of Patent: *Jun. 6, 2017

(54) MANAGING POWER CONSUMPTION STATE OF ELECTRONIC DEVICES RESPONSIVE TO PREDICTING FUTURE DEMAND

(71) Applicant: AT&T INTELLECTUAL PROPERTY I, LP, Atlanta, GA (US)

(72) Inventors: Marc Sullivan, Austin, TX (US); Greg W. Edwards, Austin, TX (US); Kurt M. Joseph, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/839,103

(22) Filed: Aug. 28, 2015

(65) Prior Publication Data

US 2015/0370307 A1 Dec. 24, 2015

Related U.S. Application Data

(63) Continuation of application No. 13/485,045, filed on May 31, 2012, now Pat. No. 9,152,203.

(51) Int. Cl.
*G06F 1/00* (2006.01)
*G06F 1/32* (2006.01)
*G06F 9/44* (2006.01)

(52) U.S. Cl.
CPC .......... *G06F 1/3234* (2013.01); *G06F 1/3206* (2013.01); *G06F 9/4418* (2013.01)

(58) Field of Classification Search
CPC .... G06F 1/3203; G06F 1/3206; G06F 9/4418; G06F 1/3234
(Continued)

(56) References Cited

U.S. PATENT DOCUMENTS

| 6,292,943 B1 | 9/2001 | Shin |
| 7,411,631 B1 | 8/2008 | Joshi |

(Continued)

OTHER PUBLICATIONS

Energy Star, , "Energy Star® Program Requirements Product Specification for Set-top Boxes", Eligibility Criteria, Version 4.0.

*Primary Examiner* — Aurel Prifti
(74) *Attorney, Agent, or Firm* — Guntin & Gust, PLC; Douglas Schnabel

(57) ABSTRACT

A system and process that incorporates teachings of the subject disclosure may include, for example, transitioning a processor from a high-power consumption state to a low-power consumption state, wherefrom return to the high-power consumption state includes a boot process. Future demand for operation of the processor in the high-power consumption state is predicted, while the processor is in the low-power consumption state. The processor is transitioned from the low-power consumption state to the high-power consumption state in response to predicting future demand for operation of the processor in the high-power consumption state. Such transition of the processor from the low-power consumption state to the high-power consumption state sufficiently precedes actual demand for operation of the processor in the high-power consumption state so as to avoid perceptible user delay. Other embodiments are disclosed.

20 Claims, 8 Drawing Sheets

(58) Field of Classification Search
USPC ........ 434/236; 455/418, 41.2; 713/300, 320; 345/697; 704/275
See application file for complete search history.

(56) References Cited

U.S. PATENT DOCUMENTS

| | | |
|---|---|---|
| 8,046,468 B2 | 10/2011 | Isci et al. |
| 8,208,391 B2 | 6/2012 | Gurney et al. |
| 2002/0152473 A1 | 10/2002 | Unger |
| 2005/0289624 A1 | 12/2005 | Shin |
| 2006/0109384 A1 | 5/2006 | Miller-Smith |
| 2006/0284969 A1* | 12/2006 | Kim ................ G06F 21/316 348/14.01 |
| 2008/0270814 A1 | 10/2008 | Starr et al. |
| 2010/0079508 A1* | 4/2010 | Hodge ................ G06F 3/013 345/697 |
| 2010/0332876 A1 | 12/2010 | Fields, Jr. et al. |
| 2011/0113269 A1 | 5/2011 | Park |
| 2011/0126034 A1* | 5/2011 | Siegel ................ G06F 1/3203 713/320 |
| 2011/0153525 A1 | 6/2011 | Benco et al. |
| 2011/0171909 A1* | 7/2011 | Jung ................ H04W 48/16 455/41.2 |
| 2011/0181412 A1 | 7/2011 | Alexander |
| 2011/0250875 A1* | 10/2011 | Huang ................ H04W 4/02 455/418 |
| 2012/0052873 A1 | 3/2012 | Wong |
| 2012/0110351 A1* | 5/2012 | Raju ................ G06F 1/3203 713/300 |
| 2012/0237908 A1* | 9/2012 | Fitzgerald ............ G06F 21/88 434/236 |
| 2012/0253881 A1 | 10/2012 | Schneider et al. |
| 2013/0103217 A1 | 4/2013 | Tadano |
| 2013/0123996 A1 | 5/2013 | Matos |
| 2013/0124885 A1 | 5/2013 | Davis et al. |
| 2013/0127443 A1 | 5/2013 | Honjo et al. |
| 2013/0191662 A1 | 7/2013 | Ingrassia, Jr. et al. |
| 2013/0308618 A1 | 11/2013 | Panneerselvam |
| 2014/0082383 A1 | 3/2014 | De Cesare et al. |
| 2014/0095901 A1 | 4/2014 | Stefanov et al. |
| 2014/0214429 A1* | 7/2014 | Pantel ................ G10L 21/16 704/275 |

* cited by examiner

600

MANAGING POWER CONSUMPTION STATE OF ELECTRONIC DEVICES RESPONSIVE TO PREDICTING FUTURE DEMAND

CROSS-REFERENCE TO RELATED APPLICATION(S)

This application is a continuation of U.S. patent application Ser. No. 13/485,045 filed May 31, 2012 by Sullivan et al., entitled "Managing Power Consumption State of Electronic Devices Responsive to Predicting Future Demand." All sections of the aforementioned application(s) are incorporated herein by reference in its entirety.

FIELD OF THE DISCLOSURE

The subject disclosure relates generally to multimedia processing and more specifically to power management of multimedia processing devices.

BACKGROUND

Media processing devices, such as television set top boxes or receivers, consume significant energy in the home today. Current designs of such devices have emphasized low-cost and functionality over energy efficiency. Some media processors can transition into a low-power state after some substantial period of inactivity (e.g., after about 8 hours). Such low-power states might include turning off a video output or bit stream to a display, or in some instances, changing it to a static information display. As a result, a number of processing or CPU cycles can be reduced. Other power-saving measures include de-spinning a hard disk drive, and eliminating a network load of the video stream. Otherwise, the media processor remains in a relatively high-powered state, such that an internal processor can transition to an on state instantaneously. Thus, when user demand, by way of a user input, such as an infrared signal is received, a media processor established in the low-power state can become immediately available for use (e.g., presenting streaming media to a display and/or recording at a digital video recorder) without a noticeable delay to the user.

Unfortunately, current media processors operating in low-power states that allow an "instant on" feature still consume significant amounts of electricity. Namely, a video signal is still being output to a display device, and all of the components in the media processor generally remain in fully powered mode.

Transitioning to a lower power state, for example, by removing power to other media processor subcomponents, such as a central processor, and network interface, can be accomplished. However, transitioning to a "power on" state will require a "boot process" that can result in a lengthy delay taking three to five minutes or more before the media processor is operational.

Some media processors use simple timer based inactivity to enter a so called "deep sleep" state. Namely, after some interval of receiving no user inputs at the media processor, the media processor may provide a deep sleep warning. If no action is taken after a brief period of time after such a warning, the media processor enters the deep sleep sate. Subsequent user interaction with the media processor initiates an unavoidable and lengthy boot process so that the media processor can become active again.

BRIEF DESCRIPTION OF THE DRAWINGS

Reference will now be made to the accompanying drawings, which are not necessarily drawn to scale, and wherein.

DETAILED DESCRIPTION

Figure 1:
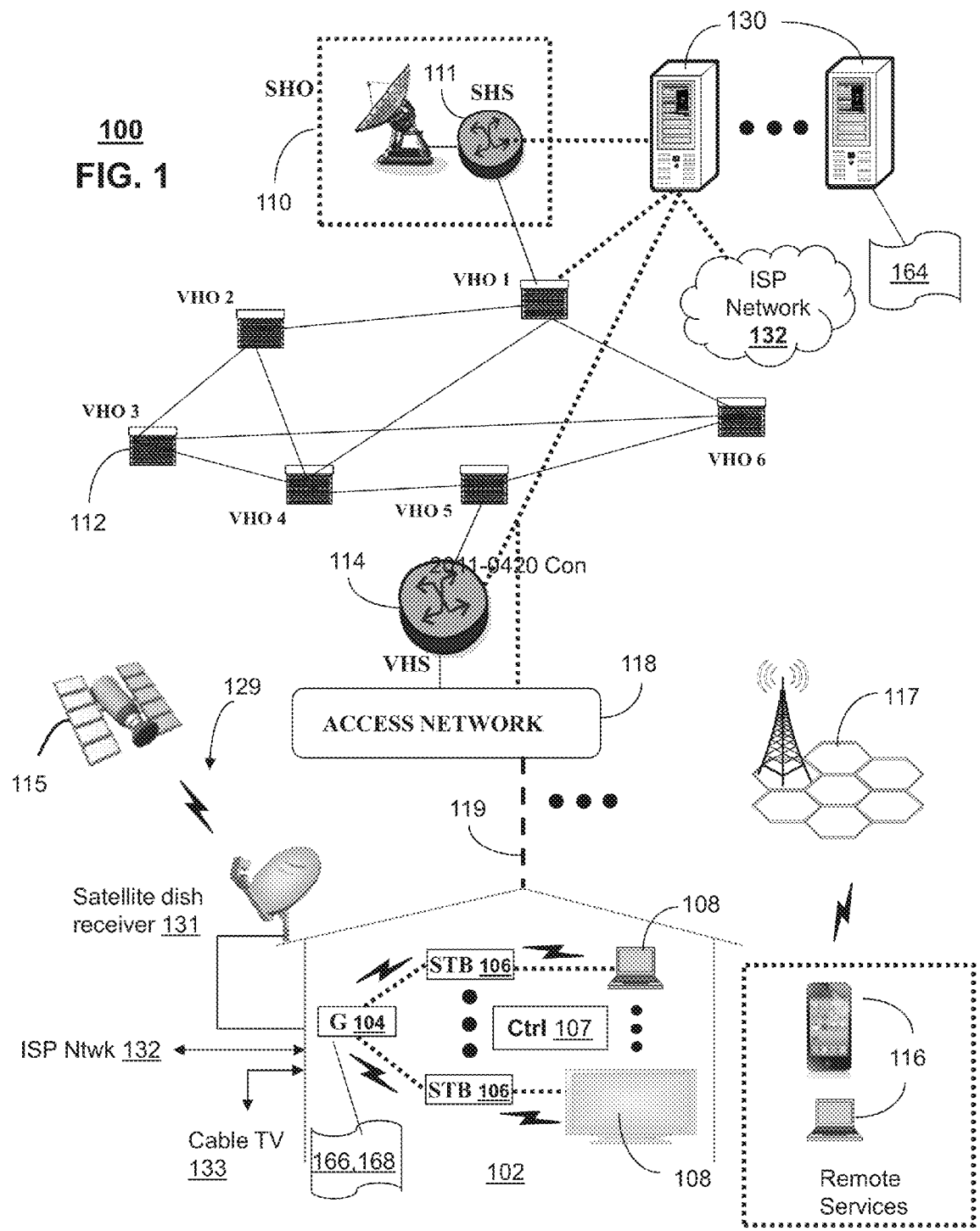
FIGS. 1-2 depict illustrative embodiments of communication systems that provide media services.

The subject disclosure describes, among other things, illustrative embodiments of media processors capable of entering extremely low power consumption, or deep sleep states, while also being able to respond to user interaction without a substantial or even perceptible delay. In such "deep sleep" states, substantially all power to the media processor can be shut down except for a component, such as a microcontroller, providing minimal functionality. Such minimal functionality can include an ability to receive user input (e.g., from a front panel control or IR signal), or initiating a wake-up process in order to make a digital video recorder recording. In deep sleep no video signal is output, while other major subcomponents, such as the central processing unit, hard disk drive, and network interface are turned off. Preferably, such features support certification of such devices under energy saving programs and initiatives, as the Environmental Protection Agency's Energy Star certification program. Other embodiments are contemplated by the subject disclosure.

One embodiment of the subject disclosure includes a process for conserving power in a media processor. The process includes transitioning the media processor from a high-power consumption state to a low-power consumption state. The low-power consumption is characterized in that return to the high-power consumption state includes a boot process. Future demand for operation of the media processor in the high-power consumption state is predicted, while the media processor is in the low-power consumption state. The media processor is transitioned from the low-power consumption state to the high-power consumption state in response to predicting future demand for operation of the media processor in the high-power consumption state. Beneficially, transition of the media processor from the low-power consumption state to the high-power consumption state, precedes actual demand for operation of the media processor in the high-power consumption state. The media processor is subsequently returned from the high-power consumption state to the low-power consumption state.

Another embodiment of the subject disclosure includes a non-transitory computer-readable storage medium including computer instructions, which when executed by at least one processor cause the at least one processor to perform operations. The operations include predicting future demand for operation of the media processor in a high-power consumption state, while the media processor is in a low-power consumption state. The operations also include transitioning the media processor from the low-power consumption state to the high-power consumption state in response to predicting future demand for operation of the media processor in the high-power consumption state. Such that transition of the media processor from the low-power consumption state to the high-power consumption state, precedes actual demand for operation of the media processor in the high-power consumption state.

Yet another embodiment of the subject disclosure includes a power conserving device, including a memory storing computer instructions, and at least one processor coupled to the memory. The at least one processor, responsive to executing the computer instructions, performs operations including predicting future demand for operation of the media processor in a high-power consumption state, while the media processor is in a low-power consumption state. The at least one processor, responsive to executing the computer instructions, also performs transitioning the media processor from the low-power consumption state to the high-power consumption state in response to predicting future demand for operation of the media processor in the high-power consumption state. Transition of the media processor from the low-power consumption state to the high-power consumption state precedes actual demand for operation of the media processor in the high-power consumption state.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the subject disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116. In some embodiments, the one or more computing devices 130 can include a usage tracking processor 130 respectively tracking usage of one or more media processors 106, as an indication of historical power consumption demands of each respective media processor 106. Such usage can be determined, for example, according to media content received by the media processor 106.

Communication system 100 can also provide for all or a portion of the computing devices 130 to function as a usage tracking processor (herein referred to as usage tracking processor 130). The usage tracking processor 130 can use computing and communication technology to perform function 164, which can include among things, respectively tracking usage of one or more media processors 106. The media processors 106 and wireless communication devices 116 can be adapted with software functions 166 and 168, respectively, to utilize the services of usage tracking processor 130, for example, to maintain activity logs and/or to determine one or more of a probability of usage and a probability of non-usage.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on.

Other present and next generation wide area wireless network technologies are contemplated by the subject disclosure.

Figure 2:
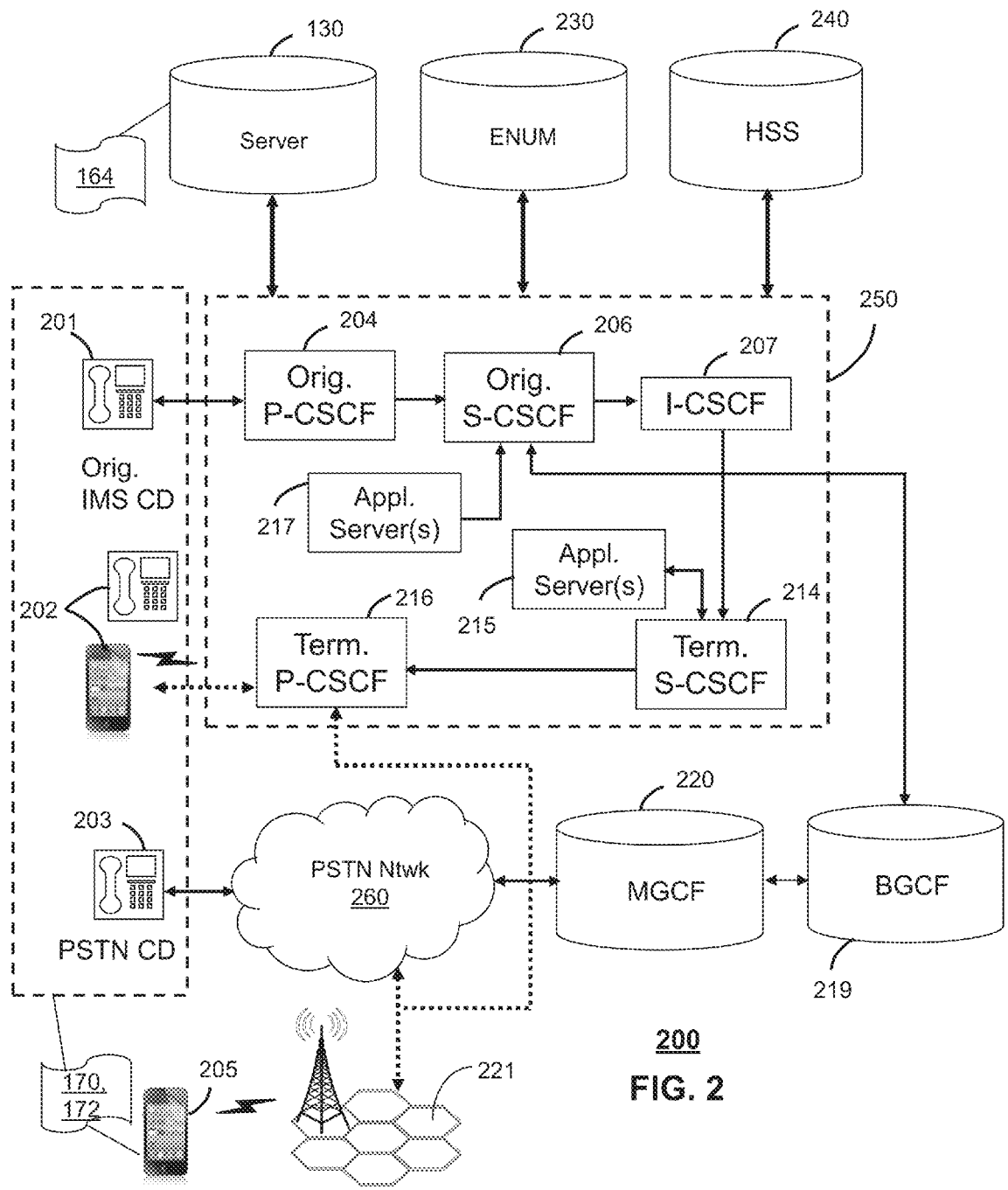

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The usage tracking processor 130 of FIG. 1 can be operably coupled to the second communication system 200 for purposes similar to those described above. It is further contemplated by the subject disclosure that usage tracking processor 130 can perform function 164 and thereby provide usage tracking services to the CDs 201, 202, 203 and 205 of FIG. 2. CDs 201, 202, 203 and 205, which can be adapted with software to perform function of tracking media processor usage 170 to utilize the services of the usage tracking processor 130. It is further contemplated that the usage tracking processor 130 can be an integral part of the application server(s) 217 performing function 172, which can be substantially similar to function 168 determining one or more of a probability of usage and a probability of non-usage and adapted to the operations of the IMS network 250.

The usage tracking processor 130 of FIG. 1 can be operably coupled to the second communication system 200 for purposes similar to those described above. It is further contemplated by the subject disclosure that usage tracking processor 130 can perform function 164 and thereby provide usage tracking services to the CDs 201, 202, 203 and 205 of FIG. 2. CDs 201, 202, 203 and 205 can be adapted with software to perform function 170 to utilize the services of the usage tracking processor 130. It is further contemplated that the usage tracking processor 130 can be an integral part of the application server(s) 217 performing function 172, which can be substantially similar to function 166, maintaining activity logs, and adapted to the operations of the IMS network 250.

Figure 3:
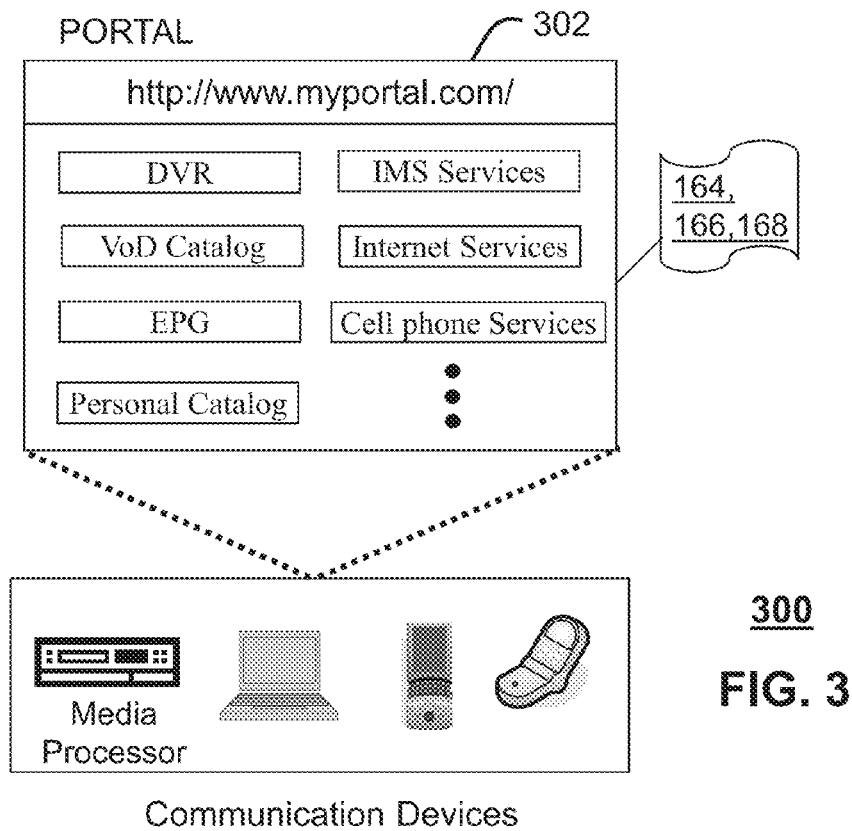
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision software applications 164-168, and 170-172 to adapt these applications as may be desired by subscribers and service providers of communication systems 100-200.

Figure 4:
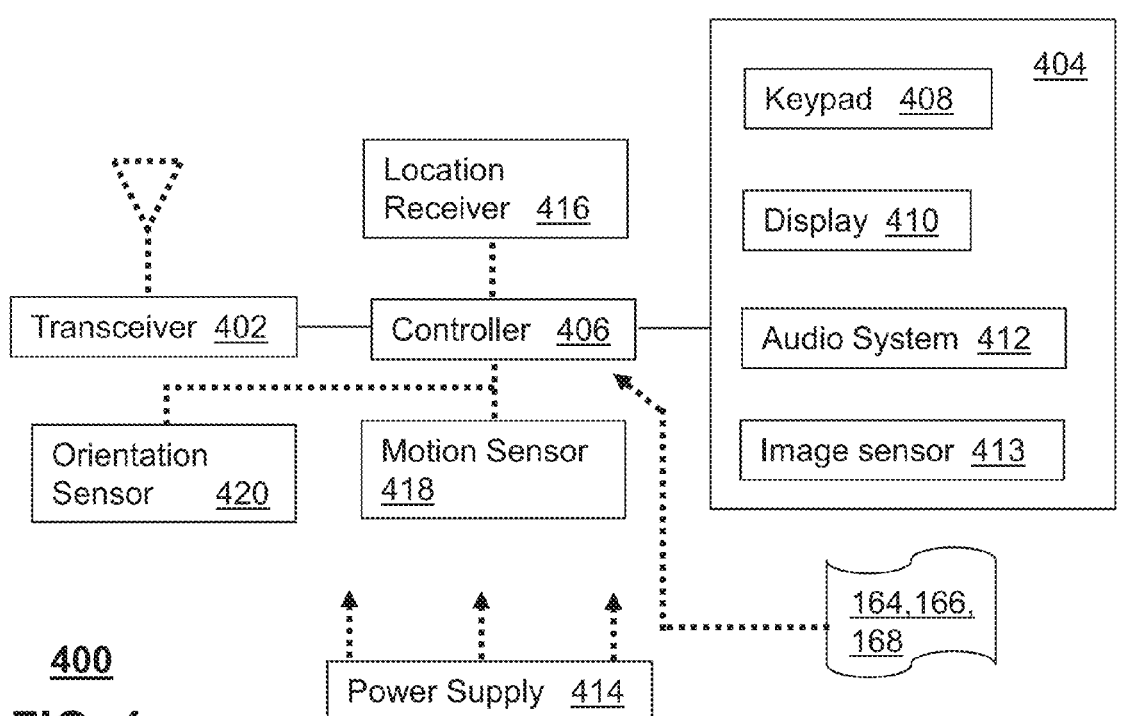
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the subject disclosure that the communication device 400 shown in FIG. 4 or portions thereof can serve as a representation of one or more of the devices of communication systems 100-200. It is further contemplated that the controller 406 can be adapted in various embodiments to perform the functions 164-168 and 170-172, respectively.

Figure 5:
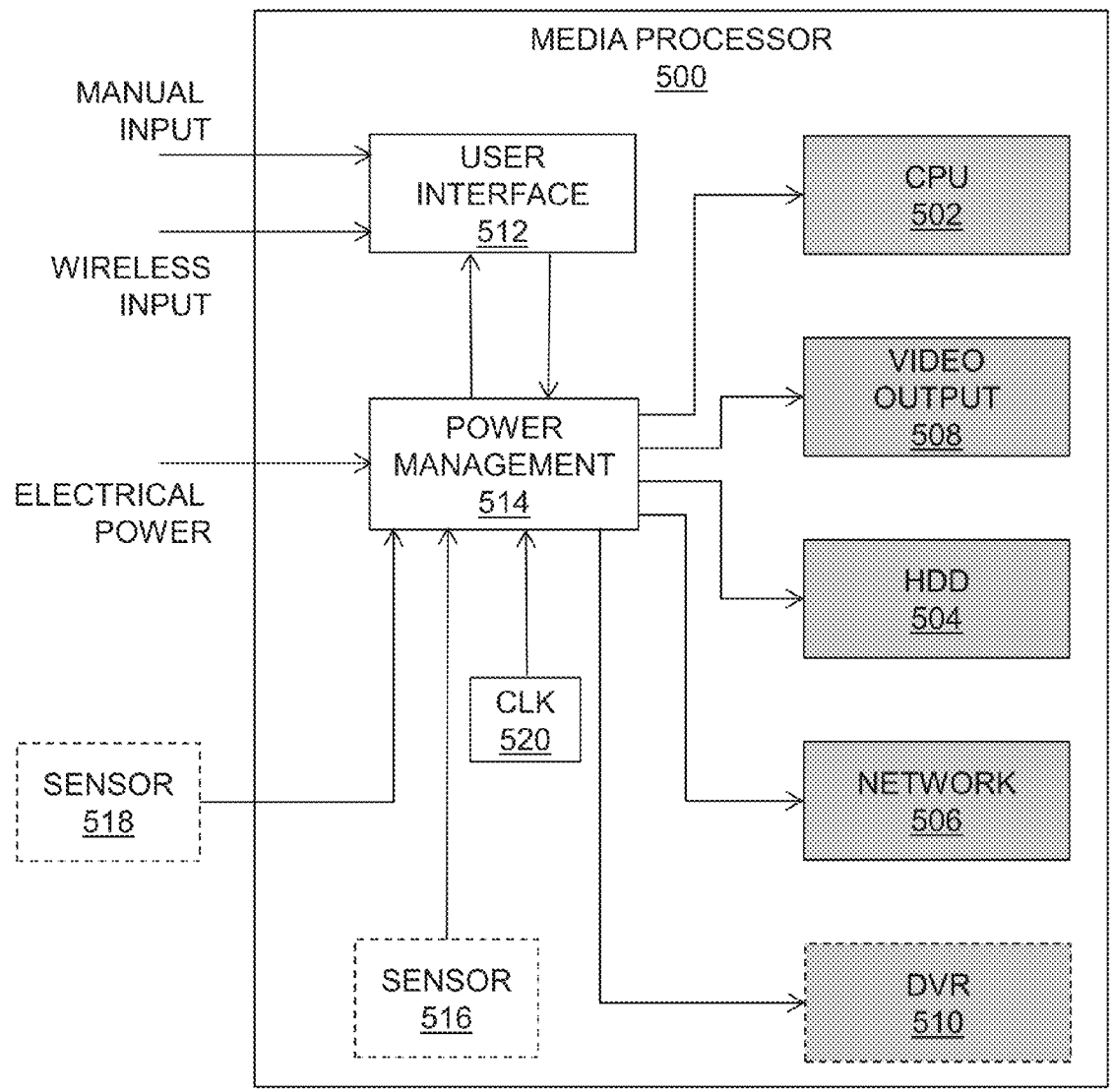
FIG. 5 depicts an illustrative embodiment of a system that performs power management.

FIG. 5 depicts an illustrative embodiment of a media processor including power management features. The media processor 500 includes at least one central processing unit 502, a video output module 508, a local storage device, such as an internal hard disk drive 504, and a network interface module 506. The video output module 508, when activated, provides a video signal, such as a bit stream, suitable for driving a display device. The network interface or driver module 506 is configured to support networked communications between the media processor 500 and one or more remote devices. Such networked communications can include receipt of multimedia data, such as multicast and unicast data streams. In at least some embodiments, the media processor 500 includes a media recording device, such as a digital video recorder 510 (shown in phantom).

The media processor 500 also includes a user interface 512 to provide user access allowing for control of various features of the media processor 500. For example, the user interface 512 can include front panel features, such as one or more manual controls for receiving manual user input and a display providing user feedback (e.g., time, date, multimedia source, and channel). Alternatively or in addition, the user interface 512 can include a wireless access module, such as an infrared access module for interacting with a wireless (e.g., radio frequency or infrared) user control. Thus, a user can interact with the media processor 500 to select multimedia content, to initiate viewing of selected multimedia content on a display device, and in at least some embodiments, to record at least a portion of selected multimedia content on the digital video recorder 510, and to operate the multimedia processor to subsequently view such previously recorded media content.

The media processor 500 further includes a power management module 514 configured to control application of electrical power to one or more subcomponents of the media processor 500. The power management module 514 is illustrated as receiving electrical power from a suitable power source, such as one or more internal and/or external power supplies, external power mains, or some combination of internal/external power supplies and external power mains. The power management module 514 controls application of appropriate electrical power to one or more of the subcomponents of the media processor, such as the central processing unit 502, the video output module 508, the hard disk drive, 504, the network interface module 506, the digital video recorder 510, and the user interface 512. In some embodiments, appropriate electrical power is selectively provided through the power management module 514 to one or more of the subcomponents 502, 504, 506, 508, 510, 512, such that a power state of the respective subcomponent can be controlled by provision of electrical power. Alternatively or in addition, appropriate electrical power can be provided to one or more of the subcomponents 502, 504, 506, 508, 510, 512, such that a power state of each respective subcomponent can be controlled, for example, by a switch, or suitable command initiated by the power management module 514.

In some embodiments, the power management module 514 includes a separate microprocessor configured to implement power management features, such as the any of the power management features disclosed herein. As illustrated, the power management module 514 receives sensor signals from one or more sensors 516, 518 (shown in phantom). In some embodiments, one or more of the sensors 516 can be provided within the media processor 500. Alternatively or in addition, one or more of the sensors 518 can be provided external to the media processors, being coupled to or otherwise in communication with the media processor by way of a suitable interface (e.g., hardwired, a standardized interface, a proprietary interface, wireless).

In at least some embodiments, one or more of the sensors 516, 518 detect an indication of proximity of a candidate user with respect to the media processor 500. For example, one or more of the sensors 516, 518 are configured to detect a physical property, such as light (e.g., a photo detector, such as a photodiode, a phototransistor and a charge coupled device), sound (e.g., a microphone), heat (e.g., a thermometer, a thermocouple, an infrared detector), vibration (e.g., a piezoelectric transducer), and motion (e.g., a motion detector). The one or more sensors 516, 518 can be identified to the power management module 514, for example, during a system configuration, by a respective address and/or class of sensor. The power management module 514 can implement structured power management control responsive to signals received by one or more of the sensors 516, 518, for example, according to the processes disclosed herein. In some embodiments, the power management module 514 receives a timing signal, for example, from an external timing source or an internal timing source, such as an internal system clock 520.

It is contemplated by the subject disclosure that the media processor 500 shown in FIG. 5 or portions thereof can serve as a representation of one or more of the devices of communication systems 100-200. It is further contemplated that the power management module 514 can be adapted in various embodiments to perform the functions 164-168 and 170-172, respectively.

Figure 6A:
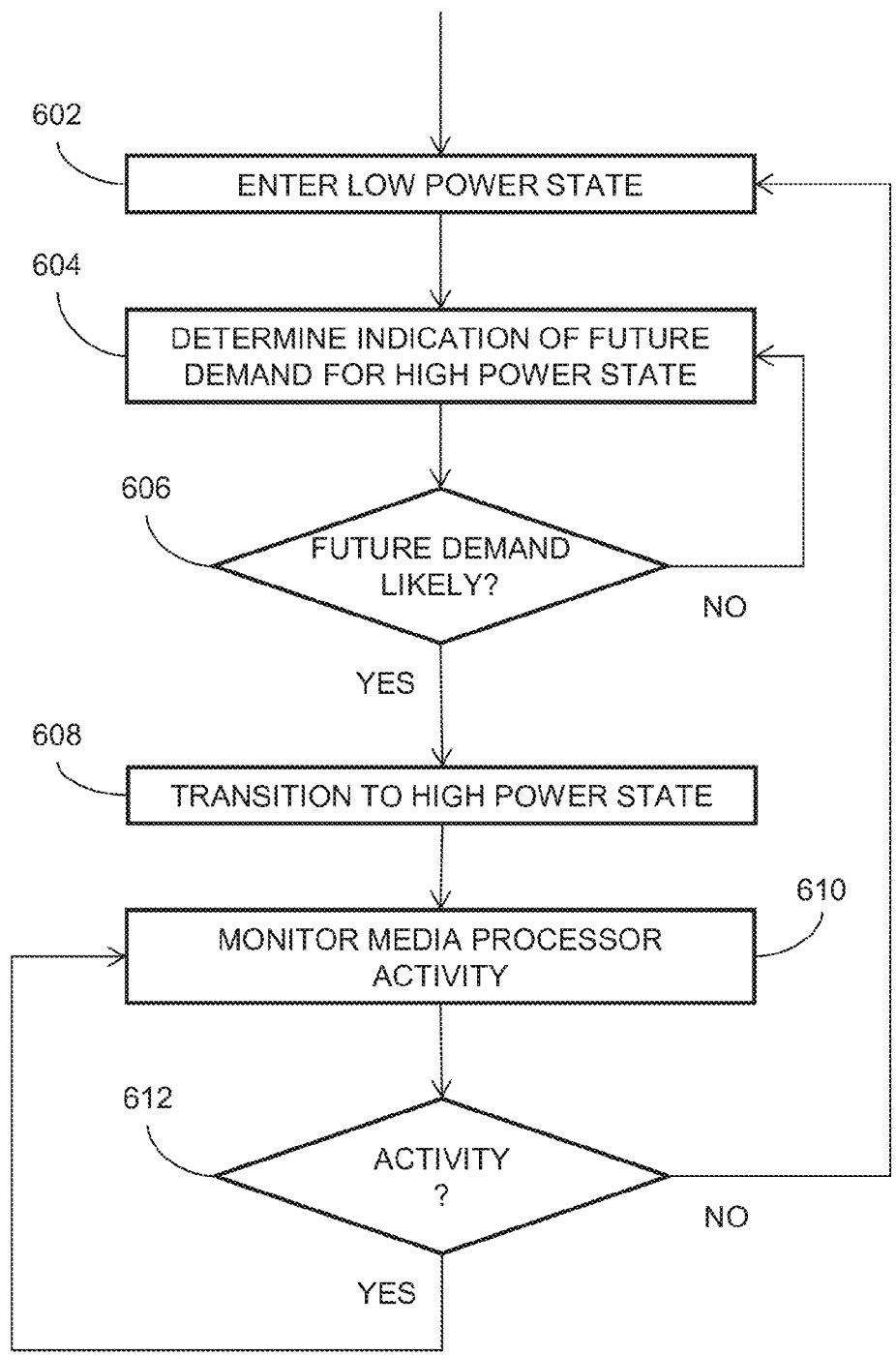
FIG. 6A depicts an illustrative embodiment of a power management process operating in portions of the systems described in FIGS. 1-5.

FIG. 6A depicts an illustrative method 600 that can operate in portions of the devices of FIGS. 1-5. It should be understood that one or more of the steps described with respect to method 600 can be used in conjunction with one or more steps described with respect to other methods or processes in the exemplary embodiments. Method 600 can begin with step 602 in which a media processor 500 (FIG. 5) enters a low power consumption state. In at least some embodiments, the low power consumption state can be characterized as requiring a reboot process to transition from the low-power consumption state to a powered state, such as "normal on" state, or a powered "standby" state. For example, a low power consumption state can include removing power from one or more subcomponents of the media processor 550 such as the central processing unit 502, the video output module 508, the hard disk drive 504, the network interface 506 and the digital video recorder 510, when present (FIG. 5). In at least some embodiments, electrical power is provided to the power management module 514, the user interface 512, for example, to at least detect a manual and/or wireless user input, and any internal sensors 516 and internal timing source 520 that may be included.

While in the low power consumption state, the media processor 500 can be configured to determine at step 604 an indication of future demand for operation in a high-power state, such as normal-on or standby. In at least some embodiments, determination of an indication of future demand can be accomplished responsive to signals received from one or more sensors 516, 518 (FIG. 5). For example, a motion sensor 516, 518 provided within the same room as the media processor may detect motion suggesting that a candidate user is present within the room. The power management module 514 receiving no signal from the motion sensor 516, 518, or a signal indicative of lack of motion results in a determination that future demand is unlikely at 606. However, the power management module 514 receiving a signal from the motion sensors 516 indicative of motion, results in a determination that future demand is likely at step 606, concluding that a candidate user is within the same room as the media processor 500.

Other external sensors 518 can include a home or office alarm system. Thus, the power management module 514 can receive a signal from a home or office alarm system, such as an alarm status being armed or unarmed, detected motion, door/window states (e.g., open, closed), and the like. The power management module 514 can be configured to determine from such inputs whether it is likely that a candidate user is within an area covered by the alarm system, such as a user's home or office.

Still further sensors can include wireless network sensors, such as WiFi™ sensors determining activity within one or more wireless networks (e.g., IEEE 802.11/a/b/g/n) established within the users home or office. It is understood that such wireless network activity sensors can provide in addition to wireless network activity, an indication of the associated wireless network user. Signals indicative of one or more of wireless network activity and identified users can be provided to the power management module 514, which in turn, can be configured to predict future demand responsive to such activity. For example, detection of any activity may result in the power management module 514 concluding that a candidate user is present in local proximity of the home or office. In response, the power management module 514 can transition the media processor 500 from a low-power consumption state to a high power consumption state. Alternatively or in addition, such conclusions as to demand of a candidate user can be tailored according to the detected user information, and or day/time of day, when available. Thus, certain users, known or speculated as being children, may be likely to view multimedia content during the afternoon; whereas, a parent who happens to be home, may be working and unlikely to view such multimedia content during a weekday afternoon. Thus, the multimedia processor 500 can tailor transition to the high power consumption state not only in response to detecting network activity, but in response to other data, including sensor input, time of day and day of week.

Sensors 516, 518 can also include general network activity sensors, landline telephone usage, and the like, associated with the user's home or office, as indicators of a candidate user's presence. Still further sensors can include one or more candidate user's geolocation information. Thus, through a suitable application, the power management module 514 receives a signal, e.g., via a network connection, indicating a geolocation of a candidate user. Such geolocation information can include position (e.g., latitude and longitude) and/or bearing and/or distance from the media processor 500, speed, and the like. In at least some embodiments, the power management module 514 can be configured to process such geolocation information to determine whether a candidate user is near home, returning home, departing from home, to provide an estimate time of arrival at home, etc. Based on such analysis of the geolocation information, the power management module can be configured to predict whether demand for a high power state operation is likely or imminent. Upon concluding such a possibility of usage demand, the power management module can transition the media processor 500 to the high power state, before any such demand for usage is made by the user.

Figure 6B:
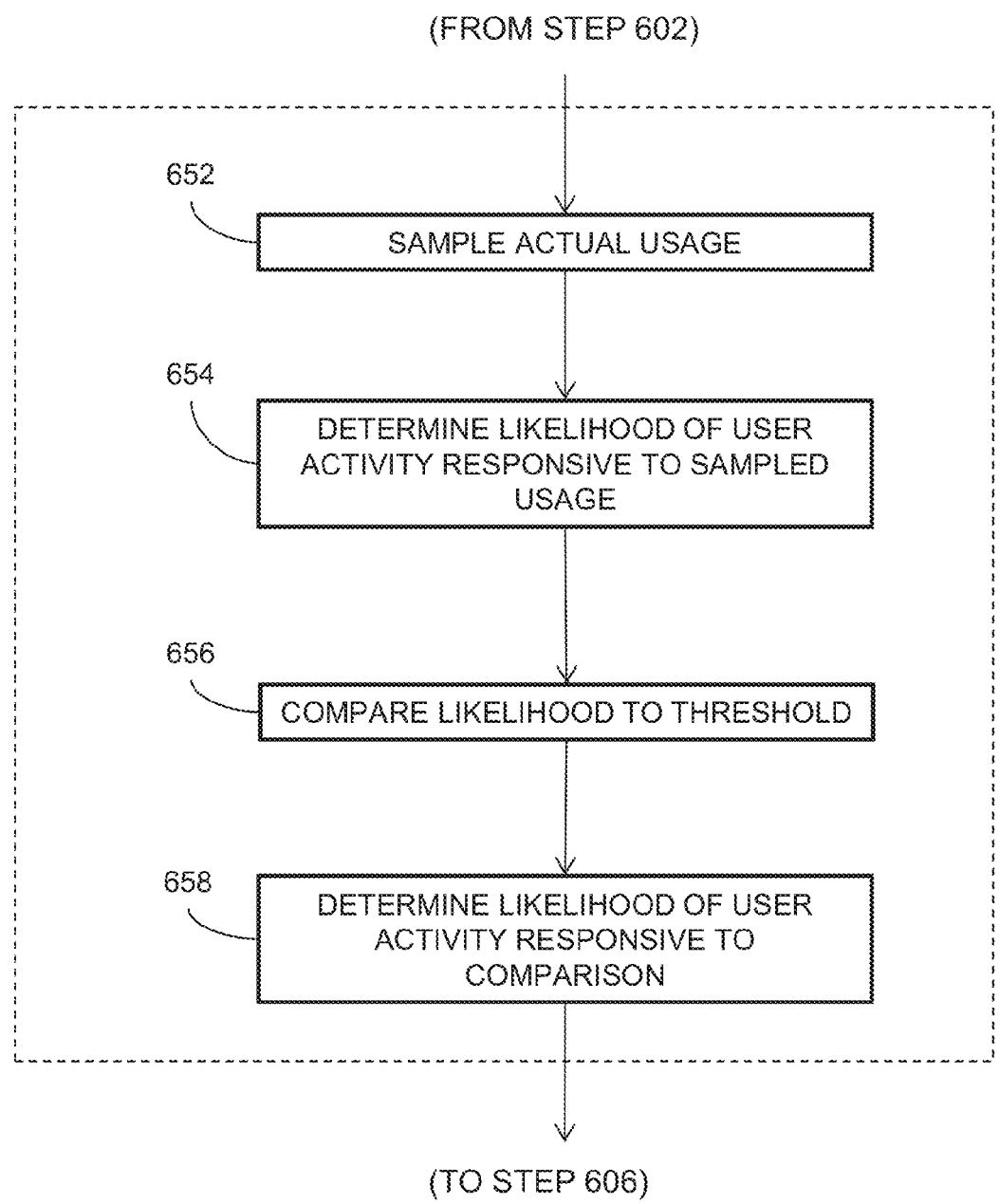
FIG. 6B depicts an illustrative embodiment of a determining demand step of the power management process illustrated in FIG. 6A.

FIG. 6B illustrates in more detail, an embodiment of a determining demand step 604 (FIG. 6A). Determining demand process 650 can be accomplished by sampling actual usage of the media processor 500 (FIG. 5) at step 652. For example, activity logs can be established and maintained by the media processor 500. Such activity logs can identify one or more of: times of usage (e.g., start and stop); durations of usage (e.g., hours, minutes, seconds); identification of respective users, if available; associated day of week and/or date; and a nature of usage (e.g., whether the respective user was viewing streaming video content, recording media content on a digital video recorder, or viewing previously recorded media content). Such activity logs can be made accessible to the power management module 514 for processing. Alternatively or in addition, the central processing unit 502, or other module of the media processor 500, or external processor, such as the user activity processor 130 (FIG. 1) can process such user logs. A processed result can be provided to the power management module 514. In at least some embodiments, such activity logs can be updated according to a schedule, for example, continuously, or daily, maintaining a running total of media processor activity.

In at least some embodiments, the processing of activity logs includes determining a likelihood of user activity in response to the sampled usage. The likelihood of user activity can be expressed as a probability of usage versus time and, in at least some instances, day of the week. The probability can range from a value of zero, indicating that the media processor 500 is never operated in a high power consumption mode during the associated time/day of the week, to a value of one, indicating that the media processor 500 is always operated in a high power consumption mode during the associated time/day. Typically, the probability of usage will reside at some measurable value between zero and one.

A first threshold can be identified at step 656, above which the power management module 514 will automatically transition the media processor 500 from the low power consumption state to the high power consumption state. For example, the first threshold can be established at a value of 0.05. Comparison of the probability value for a give time/day of the week to the first threshold, resulting in a determination that likelihood of user activity is likely for probability of usage values above the first threshold. For the example threshold of 0.05, the majority of the time (e.g., 95% of the time), when a user actually demands usage from the media processor 500, the media processor will already be in a high power consumption mode. Thus, a user would only experience an unwanted delay upon making such a demand 5% of the time.

In some embodiments, a second threshold can also be identified at step 656, below which the power management module 514 will automatically ensure that the media processor 500 is in the low power consumption state. For example, the second threshold can be established at a value of 0.02.

In at least some embodiments, the media processor includes one or more sensors 516, 518 and a process for determining a probability of usage. One or more rules can be established to accommodate results from the one or more sensors 516, 518 and the process for determining a probability of usage. For example, if both are in agreement (i.e., predict usage is imminent/not imminent), then the media processor is transitioned to the high power consumption state, or to the low power consumption state, as the case may be. For situations in which there may be conflicting agreement, one or more of the sensors 516, 518 and the process for determining the probability of usage can be weighted and combined.

Alternatively or in addition, one of the sensors 516, 518 and the process for determining a probability of usage can be favored over the other according to one or more rules. For example, the process for determining a probability of usage can be used regardless of sensor input, for situations in which the probability of usage is above the first threshold value. Alternatively or in addition, sensor input can be used for situations in which the probability of usage is below the first threshold value. For embodiments including at least two threshold values, a preference for sensor data can be established for situations in which the probability of usage value is between the at least two threshold values.

Figure 7A:
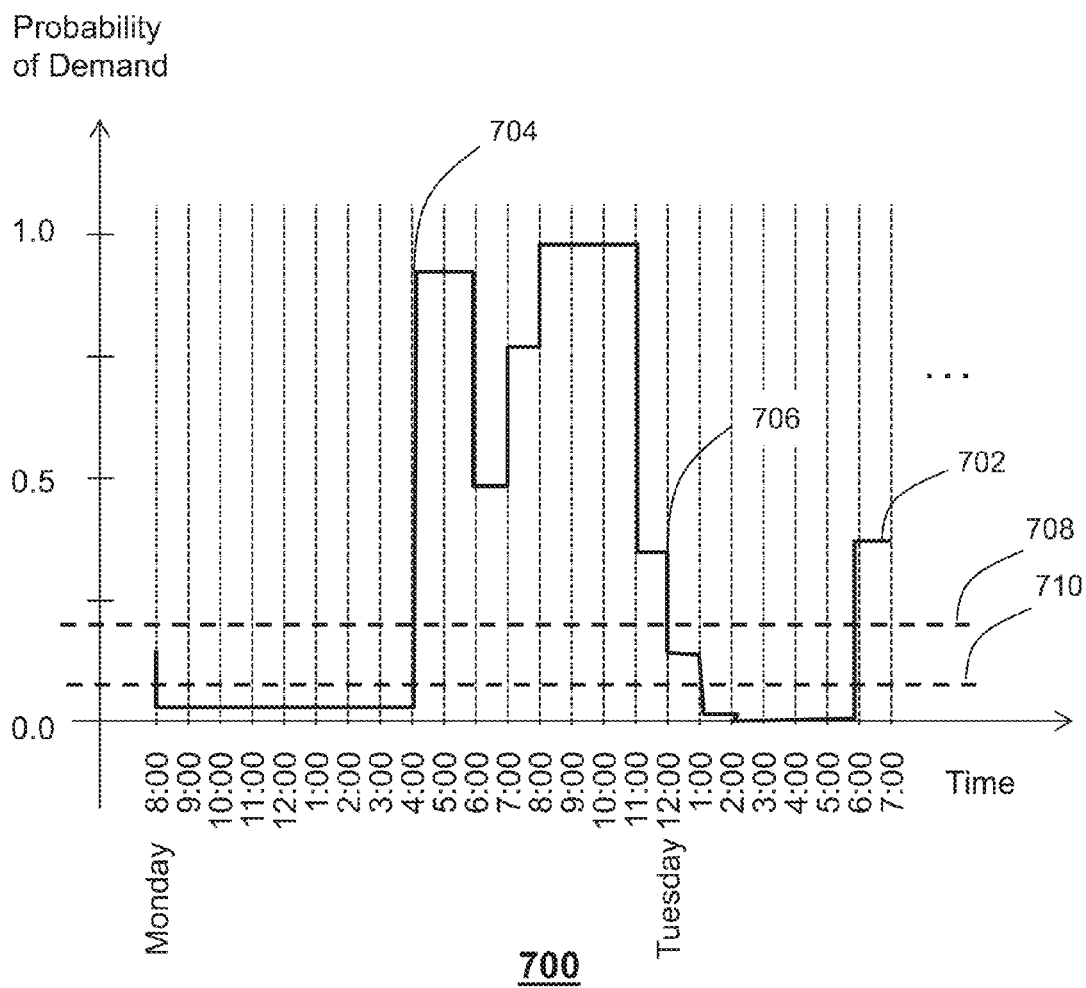
FIG. 7A depicts an illustrative example of a usage probability of a power managed device.

FIG. 7A illustrates an example portion of a determined probability of usage for a media processor 500. A resulting probability curve 702 reflects the probability of demand value versus time of day and day of week. The probability of usage value varies according to sampled prior usage, showing periods of usage and periods of non usage. Also reflected is a first threshold 708, above which usage is predicted, and a second threshold value 710 below which non-usage is predicted. Such a curve could be calculated for each day of the week, according to a prescribed time resolution value (e.g., half hour increments, hourly increments, or some other increment).

Figure 7B:
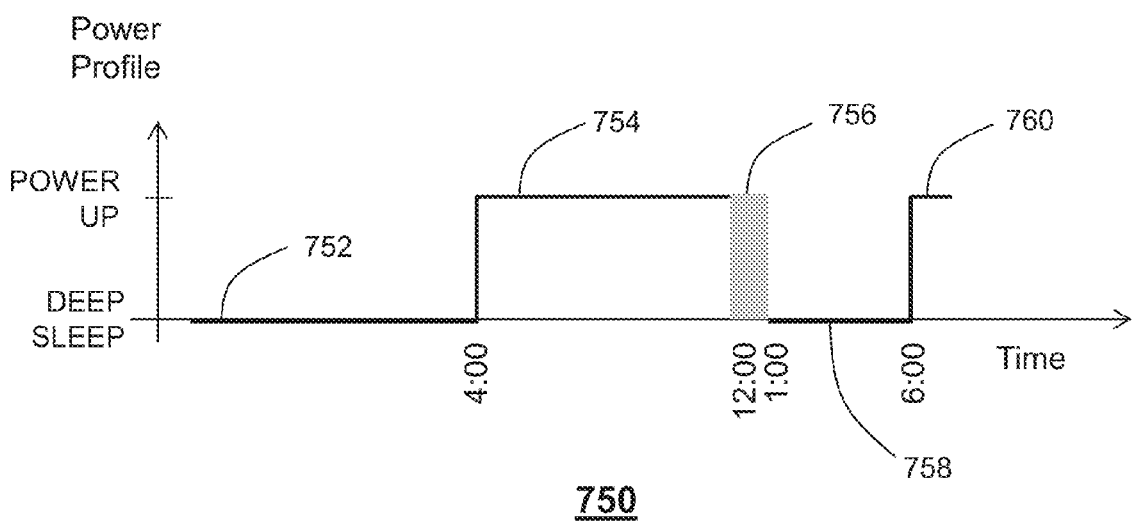
FIG. 7B depicts an illustrative embodiment of a power state profile of a power-managed device associated with the usage probability illustrated in FIG. 7A.

FIG. 7B reflects an illustrative example of a media processor 500 power status as determined from the probability of usage curve illustrated in FIG. 7A. Namely, beginning on Monday morning, at 08:00 am, the probability of usage is below the second threshold level 710. Accordingly, the media processor 500 is transitioned or otherwise remains in a low power consumption state. At about 04:00 pm, the probability of usage increases above the first threshold at 704. Accordingly, the media processor 500 is transitioned to a high power consumption state, remaining there as long as the probability of usage remains above the first threshold 708. At midnight, Monday, the probability of usage falls to a value between the first and second threshold values 708, 710. Accordingly, the media processor 500 is transitioned responsive to a pre-established, or default rule. Such a rule can include relying on sensor input for such situations. Thus, the power status may remain in a high power consumption state responsive to sensors detecting candidate user within proximity of the media processor 500. Alternatively, the power status may transition to a low power consumption state responsive to sensors not detecting candidate user within proximity of the media processor 500.

After 1:00 am, Tuesday, the probability of usage drops below the second threshold 710. Accordingly, the power status of the media processor 500 transitions or remains in a low power consumption state until 6:00 am, Tuesday, when the probability of usage, once again, rises above the first threshold 708, and the power status of the media processor transitions to a high power consumption state. The process can continue for various days of the week, days of a month, days of the year. Alternatively or in addition, the probability of usage can be determined for a representative weekday and a representative weekend day, or simply a representative day, combining results from various days into a single representative day.

It is understood that in any of the various power management scenarios disclosed herein, there will be a likelihood of false alarms. Namely, it would be preferable, in at least some scenarios, to err on the side of over predicting demand for usage, such that any actual demand for usage is met by responsive action by the media processor, without the undesirable delay associated with a boot cycle. To the extent the media processor transitioned to a high power consumption state without demand for usage occurring within some measurable time period, the media processor 500 can be returned to the low power consumption state as disclosed herein. It is anticipated that any penalties associated with such over prediction of demand usage will be outweighed by the substantial power savings realized by the low power consumption, or deep sleep state.

In response to determining that future demand is likely, the power management module 514 can initiate a transition of the media processor 500 from the low power consumption state to a high power consumption state at step 610. In particular, such a transition to a high power consumption state can occur immediately upon detection of a candidate user and before the media processor 500 receives any user input by way of the user interface 512. Preferably, such a transition to the high power consumption state occurs sufficiently before the candidate user interacts with the media processor 500 to demand usage, such that the user does not perceive any delay between such a demand and a response of the media processor 500. Namely, the transition to the high power consumption state should occur not less than a boot time (e.g., two to five minutes) before an actual user demand is made.

While in a high power consumption state, the media processor 500 can monitor activity at step 610, such as user interaction with the user interface module 512, to determine whether a display device 810 (FIG. 8) is on, whether a digital video recorder is recording multimedia content, or similar indication that the media processor is being used. While such activity is occurring, the media processor continues to monitor for a change in processor activity at 612. However, upon detection of a lack of user activity at 612, the media processor 500 transitions once again transitions to the low power consumption state at 602. It is envisioned that such a return to the low-power consumption state occurs after a delay period. The delay period can be preconfigured (e.g., 1 hour, 3 hours, 8 hours). Alternatively or in addition, the delay period can be adjusted by a user during configuration of the power management module 514 based on user preference.

In at least some embodiments, the power consumption realized in the low-power consumption state is maintained below a minimum threshold power consumption value. For example, power consumption can be maintained at not more than about 15% of power consumption in normal-on state, or 3.0 Watts, whichever is greater, according to the Environmental Protection Agency's Energy Star Eligibility Criteria, Ver. 4.0, available online.

Upon reviewing the aforementioned embodiments, it would be evident to an artisan with ordinary skill in the art that said embodiments can be modified, reduced, or enhanced without departing from the scope and spirit of the claims described below. For example, other indications of user presence and/or proximity to a media processor can be used alone or in combination with other features disclosed herein to predict or otherwise anticipate or forecast demand for usage of the media processor.

In one or more embodiments, user identification can be utilized in conjunction with the prediction of future demand. For example, one or more of the exemplary embodiments can detect the presence of a user candidate in proximity to the media processor and can identify the user candidate to predict whether the particular user candidate is likely to utilize the media processor. For instance, identification information can be obtained with respect to the user candidate, such as from communication devices of the user candidate (e.g., an identification card including an RFID tag, a mobile phone, a PDA, and so forth). The identification information can be obtained via polling of the candidate user's communication devices and so forth. The identification information can then be analyzed for predicting the likelihood that the candidate user will utilize the media processor, such as accessing usage records with respect to the identified candidate user to determine if the candidate user has in the past utilized the media processor and/or under what circumstances was the media processor utilized by the candidate user, such as what time, etc. Other identification techniques can also be utilized including imaging to capture images of the candidate user and compare them with sample images of potential candidate users for identification purposes. Other embodiments are contemplated by the subject disclosure.

Figure 8:
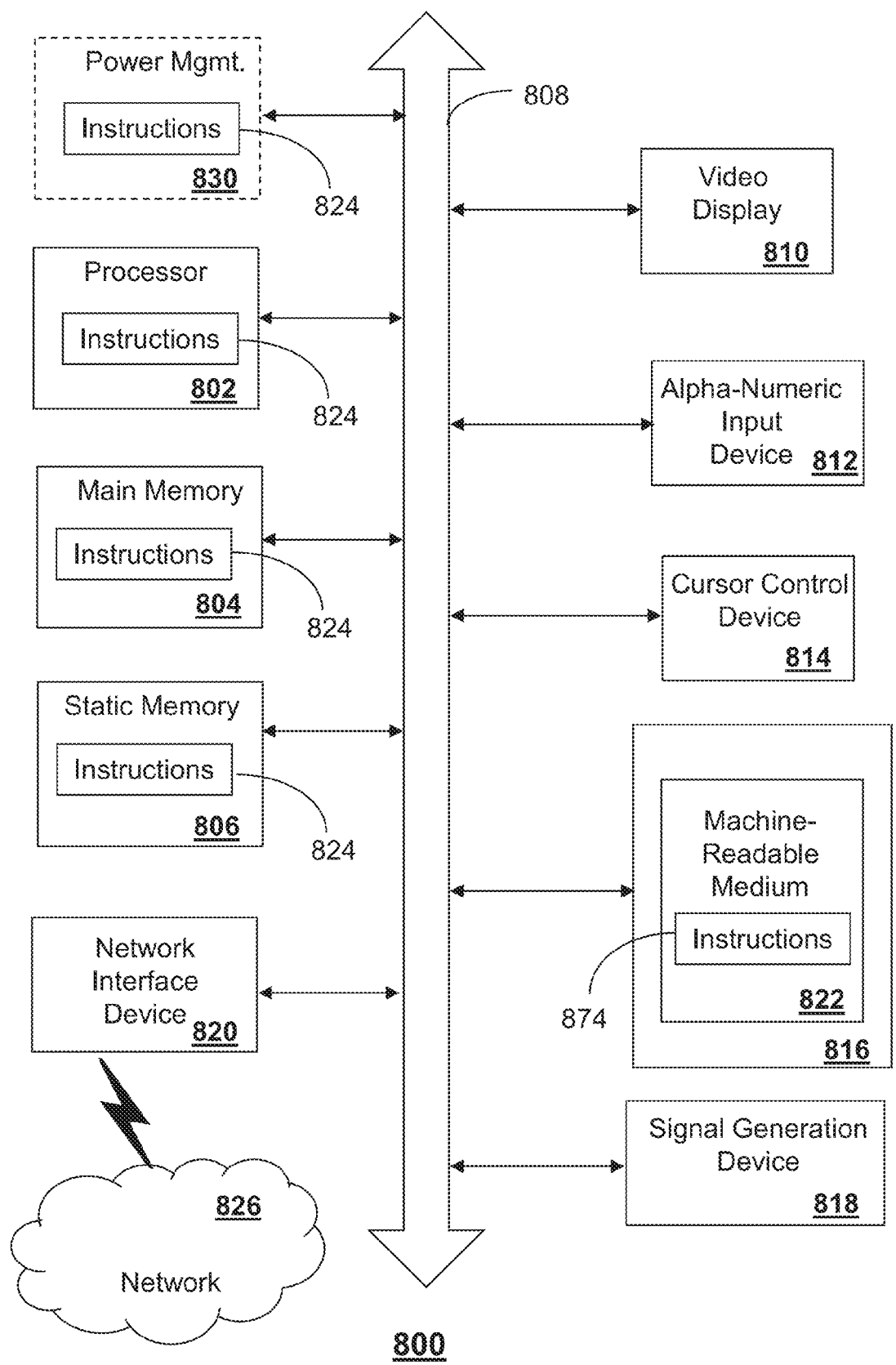
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as the usage tracking processor 130, media processor 106, and the power management module 514. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control), a network interface device 820, and a power management module 830.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 and/or within the power management module during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
transitioning, by a media processor, from a high-power consumption state to a low-power consumption state from which return to the high-power consumption state comprises a boot process;
tracking, by the media processor, prior usage of the media processor, resulting in a respective usage profile;
determining, by the media processor, a first probability of future demand for operation of the media processor in the high-power consumption state according to the respective usage profile;
receiving, by the media processor, a signal from a sensor of the media processor indicating a physical presence of a candidate user near the media processor;
determining, by the media processor, according to the signal from the sensor of the media processor, a distance between the candidate user and the media processor and one of a direction of movement by the candidate user with respect to the media processor, a speed of the movement of the candidate user, of a combination thereof;
determining, by the media processor, a second probability of future demand for operation of the media processor in the high-power consumption state, wherein the determining of the second probability of future demand is based on the distance and one of the direction, the speed, or the combination thereof, for the candidate user and wherein the determining of the second probability of future demand is performed while the media processor is in the low-power consumption state;
determining, by the media process, whether the first probability of future demand for operation of the media process is within a range;
transitioning, by the media processor, from the low-power consumption state to the high-power consumption state based on the second probability of future demand for operation of the media processor and responsive to determining that the first probability of future demand for operation of the media process is within the range; and
returning, by the media processor, from the high-power state to the low-power state.

2. The method of claim 1, further comprising:
comparing, by the media processor, the first probability of future demand to a low threshold and a high threshold;
comparing, by the media processor, the second probability of future demand to a third threshold;
if the first probability of future demand is less than the low threshold, then remaining, by the media processor, in the low-power consumption state; and
if the first probability of future demand is greater than the high threshold, then transitioning, by the media processor, to the high-power consumption state.

3. The method of claim 1, wherein the sensor for detection of the physical presence of the candidate user is a photo detector, a microphone, a thermometer, a thermocouple, an infrared detector, a piezoelectric transducer, a motion detector, or any combination thereof.

4. The method of claim 3, wherein the physical presence of the candidate user is detected according to detection of light, sound, heat, vibration, motion, or any combination thereof.

5. The method of claim 3, further comprising determining, by the media processor, a speed of the candidate user with respect to the media processor, wherein the determining of the second probability of future demand is also based on the speed.

6. The method of claim 1, wherein the determining the first probability of future demand comprises estimating future user activity.

7. The method of claim 1, wherein the tracking of the prior usage comprises logging whether the media processor presents streaming video content.

8. The method of claim 1, wherein the determining the second probability of future demand for operation of the media processor in the high-power consumption state comprises receiving from a sensor an indication of proximity of a candidate user relative to a location of the media processor.

9. A non-transitory machine-readable storage medium, comprising executable instructions that, when executed by a processor, facilitate performance of operations, comprising:
  receiving a signal from a sensor of a media processor indicating a physical presence of a candidate user near the media processor;
  determining a distance between the candidate user and the media processor according to the signal from the sensor of the media processor;
  determining one of a direction of movement, a speed of movement of the media processor, or a combination thereof according to the signal associated with the sensor of the media processor;
  predicting a first probability of future demand for operation of the processor in a high-power consumption rate based on prior usage of the processor;
  predicting, a second probability of future demand for operation of the processor in a high-power consumption state based on the distance and one of the direction, the speed, or the combination thereof, while the processor is in a low-power consumption state; and
  transitioning the processor from the low-power consumption state to the high-power consumption state according to the second probability of future demand responsive to determining that the first probability of future demand is within a range, such that transition of the processor from the low-power consumption state to the high-power consumption state precedes actual demand for operation of the processor in the high-power consumption state.

10. The non-transitory machine-readable storage medium of claim 9, wherein the second probability of future demand for operation of the processor in a high-power consumption state comprises:
  responsive to detection of a candidate user, identifying the candidate user.

11. The non-transitory machine-readable storage medium of claim 9, wherein the sensor for detection of the physical presence of the candidate user is a photo detector, a microphone, a thermometer, a thermocouple, an infrared detector, a piezoelectric transducer, a motion detector, or any combination thereof.

12. The non-transitory machine-readable storage medium of claim 9, wherein the predicting of the second probability of future demand comprises estimating future user activity, wherein the operations further comprise determining a speed of the candidate user with respect to the media processor, wherein the predicting of the future demand is based on the speed.

13. The non-transitory machine-readable storage medium of claim 12, wherein the predicting of the first probability of future demand comprises:
  tracking prior usage of the processor, resulting in a respective usage profile;
  determining the first probability of future demand for operation of the processor in the high-power consumption state, in response to the respective usage profile; and
  comparing the first probability of future demand to a threshold probability of demand,
  wherein the determining that the first probability of future demand is within the range is based on the comparing of the first probability of future demand to the threshold of probability of demand.

14. The non-transitory machine-readable storage medium of claim 9, wherein power consumption of the processor, while in the low-power consumption state, is not more than a greater of about 3 Watts and about 15% of power consumption of the media processor in the high-power consumption state.

15. An apparatus comprising:
  a processor; and
  a memory that stores executable instructions that, when executed by the processor, facilitate performance of operations, comprising:
    determining a first probability of future demand for operation of the processor in a high-power consumption state based on prior usage of the processor in the high-power consumption state;
    receiving a signal from a sensor of a media processor indicating a physical presence of a candidate user near the media processor;
    determining a distance between a candidate user and a media processor according to the signal from the sensor of the media processor;
    determining one of a direction of movement, a speed of movement of the media processor, or a combination thereof according to the signal associated with the sensor of the media processor;
    predicting, a second probability of future demand for the operation of the processor in a high-power consumption state based on the distance and one of the direction, the speed, or the combination thereof; and
    transitioning the processor from a low-power consumption state to the high-power consumption state according to the second probability of future demand in response to the first probability of future demand for operation of the processor in the high-power consumption state being within a range, such that transition of the processor from the low-power consumption state to the high-power consumption state precedes actual demand for operation of the processor in the high-power consumption state.

16. The apparatus of claim 15, wherein the predicting of the second probability of future demand comprises receiving an indication of proximity of a candidate user relative to a location of the processor.

17. The apparatus of claim 16, wherein the sensor is selected from the group consisting of light sensors, sound sensors, thermal sensors, motion sensors, and combinations thereof.

18. The apparatus of claim 15, wherein the predicting of the second probability of future demand comprises estimating future user activity.

19. The apparatus of claim 18, wherein the estimating future user activity comprises:
  tracking prior usage of the processor, resulting in a respective usage profile;

determining the first probability of further demand for operation of the processor in the high-power consumption state, in response to the respective usage profile;

comparing the first probability of future demand to a threshold probability of demand; and determining that the first probability of future demand is within the range according to the comparing.

20. The apparatus of claim 19, wherein the predicting of the second probability of future demand for operation of the processor in the high-power consumption state comprises receiving from a sensor an indication of proximity of a candidate user relative to a location of the processor.

* * * * *